United States Patent
SivasankaranNair et al.

(10) Patent No.: US 10,650,420 B2
(45) Date of Patent: May 12, 2020

(54) SYSTEM FOR REDUCING WAITING TIME

(71) Applicant: Walmart Apollo, LLC, Bentonville, AR (US)

(72) Inventors: Oonnikrishnan Puliyelil SivasankaranNair, Bangalore (IN); Pralabh Kumar, New Delhi (IN); Sourit Manna, Hooghly (IN); Pranav Kabra, Ahmedabad (IN)

(73) Assignee: WALMART APOLLO, LLC, Bentonville, AR (US)

( * ) Notice: Subject to any disclaimer, the term of this patent is extended or adjusted under 35 U.S.C. 154(b) by 429 days.

(21) Appl. No.: 15/235,450

(22) Filed: Aug. 12, 2016

(65) Prior Publication Data
US 2017/0053326 A1  Feb. 23, 2017

Related U.S. Application Data

(60) Provisional application No. 62/206,886, filed on Aug. 19, 2015.

(51) Int. Cl.
*G06Q 30/02* (2012.01)
*G06Q 10/06* (2012.01)
(Continued)

(52) U.S. Cl.
CPC ... *G06Q 30/0281* (2013.01); *G06Q 10/06393* (2013.01); *G06Q 10/06398* (2013.01);
(Continued)

(58) Field of Classification Search
CPC ......... G06Q 30/0281; G06Q 10/06393; G06Q 10/06398; G06Q 30/0633; G07G 1/0072; G07G 1/0081; G07G 1/14
(Continued)

(56) References Cited

U.S. PATENT DOCUMENTS

| | | | |
|---|---|---|---|
| 5,898,158 A | | 4/1999 | Shimizu et al. |
| 5,953,055 A | * | 9/1999 | Huang ............... G06K 9/00228 348/149 |

(Continued)

FOREIGN PATENT DOCUMENTS

| | | |
|---|---|---|
| JP | 2008003905 A | 1/2008 |
| WO | 2015069590 A2 | 5/2015 |

OTHER PUBLICATIONS

Search Report in counterpart UK Patent Application No. 1613977.6, dated Feb. 15, 2017; 7 pages.
(Continued)

*Primary Examiner* — Dylan C White
(74) *Attorney, Agent, or Firm* — Schmeiser, Olsen & Watts LLP; Sean K. Enos

(57) ABSTRACT

Provided is a system and methods for reducing wait time in a store with a plurality of checkout queues. The system includes an item counting device coupled to a shopping cart. The item counting device includes a weigh sensor and a counter, wherein the counter increments by 1 in response to the weigh sensor detecting an increase in weight as an item is placed within the shopping cart. The system includes an efficiency analyzer that determines a historical efficiency of an employee at a checkout register. Additionally, the system includes proximity processor that receives data from a customer through an input device and outputs a proximity of the customer to a queue. The system has a wait time processor that determines the wait time of a plurality of checkout queues and outputs the same to the customer.

18 Claims, 8 Drawing Sheets

(51) Int. Cl.
*G06Q 30/06* (2012.01)
*G07G 1/00* (2006.01)
*G07G 1/14* (2006.01)
*G07C 11/00* (2006.01)

(52) U.S. Cl.
CPC ....... *G06Q 30/0633* (2013.01); *G07G 1/0072* (2013.01); *G07G 1/0081* (2013.01); *G07G 1/14* (2013.01); *G07C 2011/04* (2013.01)

(58) Field of Classification Search
USPC ..................................................... 705/7.42
See application file for complete search history.

(56) References Cited

U.S. PATENT DOCUMENTS

| | | | |
|---|---|---|---|
| 7,652,687 B2 * | 1/2010 | Sorensen | G07C 9/00 348/150 |
| 7,953,606 B2 * | 5/2011 | Shirasaki | G06Q 20/204 280/33.991 |
| 8,452,660 B2 | 5/2013 | Morris | |
| 8,510,163 B2 * | 8/2013 | Hess | G06Q 30/02 705/14.11 |
| 8,612,278 B1 * | 12/2013 | Ashley, Jr. | G06Q 30/02 705/7.25 |
| 8,639,543 B2 | 1/2014 | Boss et al. | |
| 8,712,855 B1 * | 4/2014 | Weigman | G06Q 20/20 705/16 |
| 8,924,868 B2 * | 12/2014 | Hammoud | G06Q 30/00 715/761 |
| 9,129,277 B2 * | 9/2015 | MacIntosh | G06Q 20/208 |
| 2003/0015585 A1 * | 1/2003 | Wike, Jr. | G06Q 20/343 235/383 |
| 2008/0059274 A1 * | 3/2008 | Holliday | G06Q 10/06315 705/7.31 |
| 2008/0231432 A1 | 9/2008 | Stawar et al. | |
| 2009/0228363 A1 * | 9/2009 | Segev | A47F 9/047 705/16 |
| 2010/0036706 A1 | 2/2010 | Cohen | |
| 2012/0284132 A1 * | 11/2012 | Kim | G07G 1/0081 705/20 |
| 2012/0296751 A1 * | 11/2012 | Napper | G06Q 20/208 705/23 |
| 2013/0117695 A1 | 5/2013 | Hammoud | |
| 2014/0001258 A1 * | 1/2014 | Chan | G06Q 10/0875 235/385 |
| 2014/0161315 A1 * | 6/2014 | Ostrovsky-Berman | G06Q 10/10 382/103 |
| 2014/0214573 A1 | 7/2014 | Argue et al. | |
| 2014/0236653 A1 * | 8/2014 | Farrell | G07G 1/0036 705/7.15 |
| 2014/0257889 A1 | 9/2014 | Ashley, Jr. et al. | |
| 2015/0025799 A1 * | 1/2015 | Jackson | G01C 21/00 701/519 |
| 2015/0206121 A1 * | 7/2015 | Joseph | G06Q 20/208 705/23 |
| 2016/0189277 A1 * | 6/2016 | Davis | G06Q 30/0633 705/26.8 |
| 2017/0083887 A1 * | 3/2017 | Volta | G06Q 20/18 |
| 2017/0352043 A1 * | 12/2017 | Tineo | G06Q 30/0201 |
| 2018/0033018 A1 * | 2/2018 | Opalka | G06Q 10/06311 |
| 2018/0033066 A1 * | 2/2018 | Liu | G06Q 30/0623 |
| 2018/0060618 A1 * | 3/2018 | Ferrer Alos | G06K 7/10356 |
| 2018/0066978 A1 * | 3/2018 | Millhouse | G01G 19/12 |
| 2018/0108072 A1 * | 4/2018 | Jones | G06Q 30/0633 |
| 2018/0197218 A1 * | 7/2018 | Mallesan | G06Q 30/0613 |

OTHER PUBLICATIONS

"TrueView People Counter(R)", Cognimatics.com, Coginmatics, accessed Jul. 15, 2015; 3 pages.
NCR, NCR Retail Solutions: Hardware, Software and Services for Online and Offline Retail Stores, https://www.ncr.com/retail, May 31, 2019.

* cited by examiner

SYSTEM FOR REDUCING WAITING TIME

This application claims priority to U.S. Provisional Patent Application Ser. No. 62/206,886, filed on Aug. 19, 2015 entitled "System for Reducing Wait Time," the entirety of which is incorporated by reference herein.

FIELD OF THE INVENTION

The invention relates generally to reducing wait time during checkout when shopping, and more specifically, to systems for determining the shortest wait time to checkout of one of a plurality of checkout queues.

BACKGROUND

Checkout time is a key part of customer experience. Generally customers will rely on intuition to join the queue with the least number of people. Factors such as the amount items in a cart and the efficiency of the employee at the checkout queue factor in to the total wait time that a customer experiences in a store. Currently, there is no comprehensive tool to reduce the time taken by customers in checkout lanes. There is not a system that can accurately measure the items in cart, the number of people in a checkout queue or the efficiency of the employee operating the checkout queue. Accordingly, there is no system that can generate an accurate wait time in a checkout queue.

BRIEF SUMMARY

In one aspect, provided is a system for determining waiting time in store with a plurality of checkout queues, the system comprising: an item counting device coupled to a shopping cart, the item counting device comprising a weigh sensor and a counter, wherein the counter increments by 1 in response to the weigh sensor detecting an increase in weight as an item is placed within the shopping cart; an efficiency analyzer that determines a historical efficiency of an employee at a checkout register; proximity processor that receives data from a customer through an input device and outputs a proximity of the customer to a queue; and a wait time processor that determines the wait time of a plurality of checkout queues and outputs the same to the customer.

In another aspect, provided is a method of reducing wait time of a customer in store with a plurality of queues, the method comprising: calculating a number of items in a shopping cart of a customer, wherein calculating the number items in the shopping cart comprises operating an item counting device to determine a real time number of items in the shopping cart; operating an efficiency analyzer to determine an efficiency of employees operating checkout queues; determining the customer's proximity to the plurality of queues; calculating a wait time for each of the operating checkout queues of the plurality of checkout queues; and notifying the customer of the shortest wait time of a checkout queue of the operating checkout queues.

In another aspect, provided is a method of reducing wait time of a customer in store with a plurality of queues, the method comprising: calculating a number of items in a shopping cart of a customer, wherein calculating the number items in the shopping cart comprises operating an item counting device to determine a real time number of items in the shopping cart; operating an efficiency analyzer to determine an efficiency of employees operating checkout queues; determining a number of carts in each operating queue of the plurality of queues; determining a total number of items in each cart of the number of carts in each operating queue; determining the customer's proximity to the plurality of queues; calculating a wait time for each of the operating checkout queues of the plurality of checkout queues, wherein the wait time includes a calculation based on the number of items in the customer's cart, the total number of items in the number of carts in each operating checkout queue, and the efficiency of the employees operating the checkout queues; and notifying the customer of a predetermined number wait times of a predetermined number of closest checkout queues of the operating checkout queues.

BRIEF DESCRIPTION OF THE SEVERAL VIEWS OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Many store customers seek to reduce the time spent at the checkout queue in a store. Often they are left to guess by a visual inspection of which checkout queue has the least amount of people and hope that the employee operating the checkout register is efficient. Additionally, many store customers wonder why another checkout register is not opened in order to reduce wait time, when so many people are in line in a checkout queue.

In embodiments, systems of the present invention provide the information necessary for the customer to choose the most optimal lane. The system is generally based on 1) the number of items in the cart; 2) the employee efficiency at the register (based on the history data); and 3) the proximity of customer to particular queue.

Based on history data and comparisons with nearby related stores, the system will also suggest store manager to open a new check-out register.

Once a customer is ready for checkout, he/she may provide the system with the nearest register number through a mobile app operational on a mobile computing device. Based on customer input and the factors mentioned above, the system will determine the checkout queue with the least waiting time for the customer. This information may be communicated to the customer via the mobile app. In embodiments, the system may operate continuously and the update the customer with the most optimal queue based on the latest real time data available.

Figure 1:
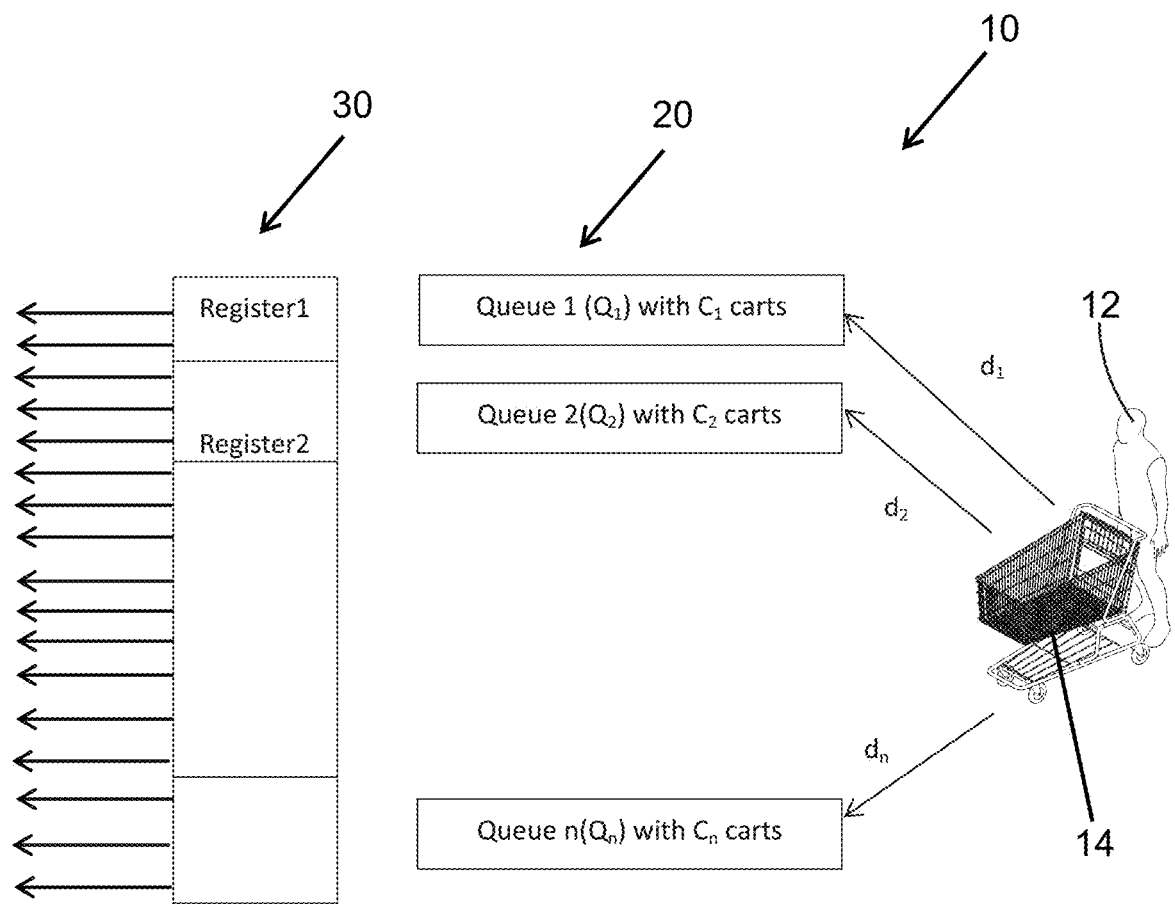
FIG. 1 is an illustrative view of a retail store at which embodiments of the present inventive concepts are employed.

FIG. 1 is an illustrative view of a retail store 10 at which embodiments of the present inventive concepts are employed. The store 10 can be a supermarket, super store, small family store, or any other brick-and-mortar retail establishment which offers, and the customers may receive, for example, purchase or rent, products and/or services, or any other entity where a commercial transaction may be performed.

The store 10 includes a plurality of checkout queues 20 and a plurality of checkout registers 30 associated with the plurality of checkout queues 20. A customer 12 can physically retrieve one or more products directly from the shelves of the store and place them in a shopping cart 14. The customer 12 may utilize the shopping cart or other carrying device for transporting the retrieved products from the shelves to a checkout register 12 for purchase.

In some embodiments, as illustrated in FIG. 1, there are n checkout registers of the plurality of registers 30 in the store 10 indicated by Register 1, Register 2 . . . Register n. At each register, there is at least one employee, i.e. Register (i) has employee Ei working on it. Each checkout register includes a corresponding checkout queue of the plurality of checkout queues 20, each designated by Q1, Q2 . . . Qn. Every queue of the plurality of queues 20 contains variable number of carts, each cart designated as C1, C2 . . . . Cn. At any time t when the customer 12 wants to check out, di is the distance to any queue qi, designated as d1, d2 . . . dn. For clarity of this disclosure, the customer 12 is a distance d1 from queue Q1, having number of cart C1 waiting to checkout at checkout register Register 1; is a distance d2 from queue Q2, having number of cart C2 waiting to checkout at checkout register Register2; and is a distance dn from queue Qn, having number of cart Cn waiting to checkout at checkout register Register n.

The system for determining the shortest wait time to checkout of store 10 operates to determine the wait time for each checkout queue Qn. For the exemplary purposes of this disclosure, the following is a simple calculation performed by the system to a single queue Q. In this example, there are c numbers of carts in the queue, (for example Cart(1) . . . Cart(c); Cart(i) contains $X_i$ number of items; the efficiency of the employee at the register is E; d is the distance of customer from the queue. The system 50 may utilize this information to compute the Serving Time, or time taken for the customer to reach the register. The system estimates that the customer moves at unit speed to reach the suggested queue.

T (C(c+1), Q, E): the algorithm for determining Serving Time, the time for Cart(c+1) to reach to register in Queue Q having employee E $$T(\text{Cart}(c+1), Q, E) = \left( \frac{1}{\textit{Eff}(E)} \times \sum_{i=1}^{c} X_i \right) + d$$

To generalize this algorithm, we compute the Serving Time for each queue. The optimal line will be the one with the least Serving Time. For a system with n queues, the optimal queue is chosen as follows.

Min($T_j$(Cart($c_j$+1),$Q_j$,$E_j$)) 1<j<n

The computation for E and $X_i$ is detailed below.

Figure 2:
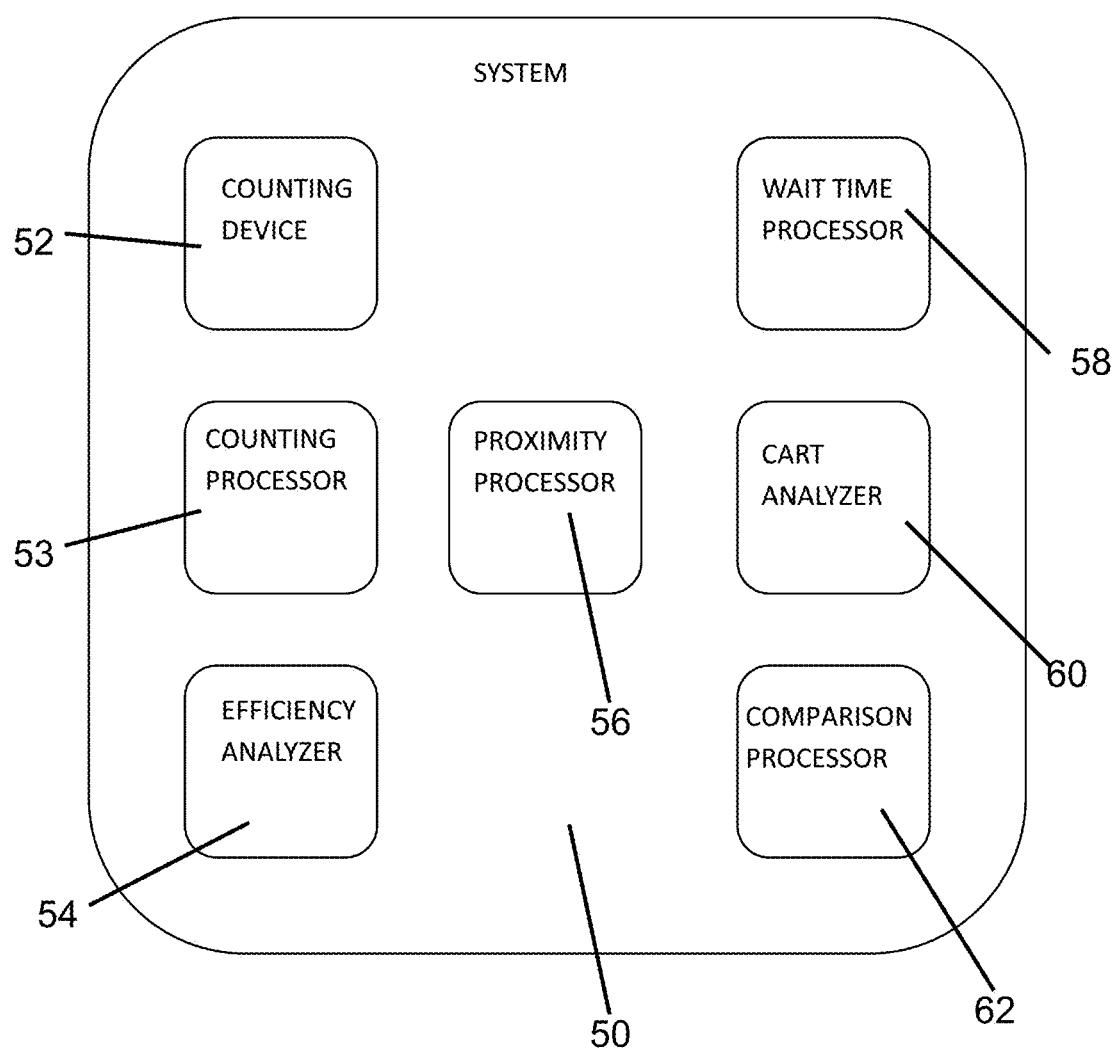
FIG. 2 is a block diagram of a system for reducing wait time in a store.

FIG. 2 is a block diagram of a system 50 for determining wait time according to embodiments. The system 50 may comprise an item counting device 52, a counting processor 53, an efficiency analyzer 54, a proximity processor 56, a wait time processor 58, a cart analyzer 60, and a comparison processor 62.

The item counting device 52 is coupled to a shopping cart 14, and may be coupled to a base of the shopping cart 14. The item counting device comprises a weigh sensor and a counter, wherein the counter increments by 1 in response to the weigh sensor detecting an increase in weight as an item is placed within the shopping cart 14. The counter of the item counting device 52 decrements by 1 in response to the weigh sensor detecting a decrease in weight as an item is removed from the shopping cart 14. Because the counter only increases or decreases in response to the change in weight up and down as determined by the weigh sensor, it is an accurate count of the number of items within the cart 14. This is more accurate and cost effective than other forms of counting items, such as using a bar code scanner, an RF sensor and the like.

The counting device operates in accordance with the following. At the beginning (time t), the cart 14 will have no objects and the weight would be 0, and the counter will have a 0 value.

w(t)=0 n(t)=0 where w(t)=weight shown by apparatus at time t n(t)=value of counter by the apparatus at time t When one object or item is added to the cart(time $t_1$), then $w(t_1) > w(t)$. This increase in weight will trigger an increase in the counter value, for example:

$$n(t_1) = n(t) + 1$$

$$n(t_1) = 0 + 1 = 1$$

Similarly at any time t2, the user takes out an item from the cart, then $w(t_2) < w(t_1)$. Correspondingly, the value of counter decrements by 1, i.e., $$n(t_2) = n(t_1) - 1$$

$$n(t_2) = 1 - 1 = 0$$

Accordingly, the counter measures the number of items in the cart 14 at any instant.

When the customer 12 is at the checkout queue, this real time cart data is transmitted to the system 50, which is then used as the real time value for our calculation of waiting time.

There may be limitations in the calculation of number of items using real time data, such as placing an item in the cart 14, wherein the weight of the item is so light, that there is a negligible change in the weight that the weigh sensor does not register an increase or decrease in weight of the cart 14. Accordingly, the system 50 must consider trends in cart sizes from a historical perspective.

The system 50 includes the counting processor 53 that receives real time data from the item counting device 52 and receives historical cart size data stored in a memory of the system 50 and outputs a number of items within the shopping cart 14. In embodiments, the counting processor 53 predicts the number of items in a cart 14 using a linear regression model to account for the real time data and the historical cart size data.

The combination of both real-time and historical data may be used to minimize the errors in the count of items using the system 50. A linear regression model may be used to account for both the factors to predict the number of items in the cart at a particular instant of a day. The regression model may be used in an iterative manner in order to collect additional data over time to have a more reliable number. The iterative process also provides for counts at different times of year, such as holidays and the like.

In order to illustrate the linear regression model, the following is an example. The items in carts in a store may be collected for a period of one month to obtain the real time data during the month and fit the model using that data. The variables affecting the amount of items in the shopping cart 14 are linearly related, and accordingly a linear regression model is the best fit for predicting the items in a cart. The sales patterns of a store is typically variable for each day of the week and also variable over a period of a month. In this example, and not by way of limitation, the sales patterns are grouped in two groups, the first half of the month and the second half of the month. The system 50 may utilize a linear regression model $z=\alpha+\beta x+\gamma y$, where, x=Historical data, y=real time data & z=actual number of items in cart.

Figure 3:
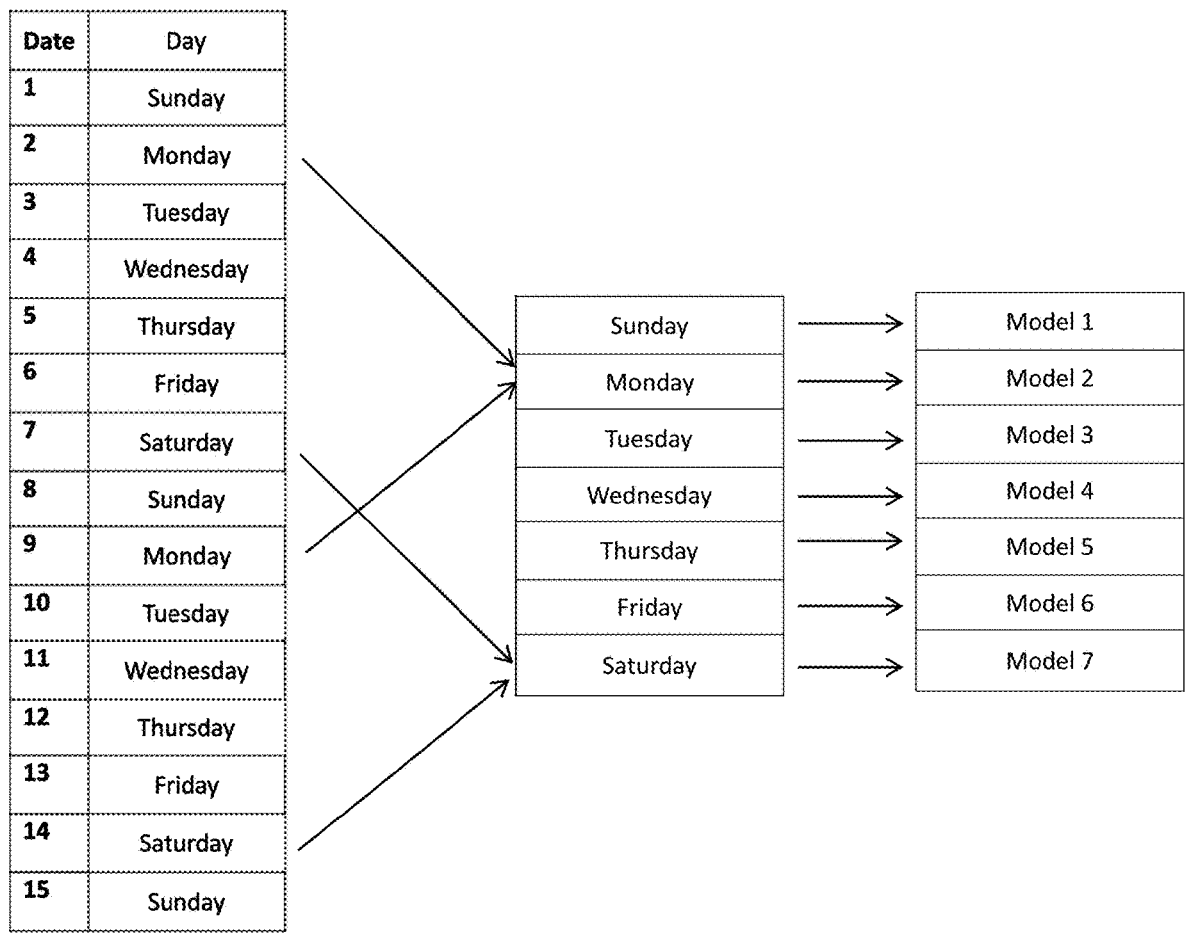
FIG. 3 is an illustrative view of determining historical cart size data.

FIG. 3 illustrates how the linear regression model is utilized to predict the number of items in the cart 14. FIG. 3 represents the creation of models for the first fifteen days of the month. As per the illustration, Model 1 will be used to estimate the number of items in a cart for all Sundays, Model 2 for all Mondays, Model 3 for all Tuesdays, Model 4 for all Wednesdays, Model 5 for all Thursdays, Model 6 for all Fridays, and Model 7 for all Saturdays in the first half of the month. The procedure may be repeated for the second half of the month and obtain 7 more models to estimate the number of items in the cart for the days of the week in the second half of the month. This results in a total of 14 models for this particular example.

Computation of the data points includes the considerations that each data point is a (x,y,z) triplet representing one hour in the day, and fitting the model, the system 50 may consider the historical data for the past year and the real time data for the past month.

Computing the z data point may include obtaining actual sales data in the one month pilot period. The z data point is thus the average number of items in a cart in a particular hour of the day on the first Sunday, Monday, Tuesday, Wednesday, Thursday, Friday or Saturday of the month. The z data point may be represented as:

$$z = f(d, h)$$

where, $f(d, h) = \dfrac{\text{Total number of items checked out}}{\text{Total number of carts}}$ on $d^{th}$ day $h^{th}$ hour $d$ = corresponding day of last month $h$ = hour of the day In this example, d=first Monday of December and h=hour of the day we are computing for. For instance, in $h^{th}$ hour, 4 carts which checkout, carry 10, 15, 5 and 10 number of items, then the value of z is, $$z = \dfrac{10+15+5+10}{4} = 10$$

Computing the y data point may include obtaining data from the real-time images and sensors in the cart. It is the average number of items in the cart during the particular hour. The y data point may be represented as:

$$y = g(d, h)$$

where, $g(h, d) = \dfrac{\text{Total number of items checked out as per real time data}}{\text{Total number of carts}}$ on $d^{th}$ day $h^{th}$ hour $d$ = corresponding day of last month $h$ = hour of the day In this example, in a particular hour, if the real time data shows 4 carts to carry 8, 11, 9 and 8 number of items, then the value of y is, $$y = \dfrac{8+11+9+8}{4} = 9$$

Computing the x data point may include obtaining data from the past year's data to obtain x to capture the sales pattern over the entire year. The x data point may be represented as:

$$A_h = \text{Average for hour } h = \dfrac{\text{Total number of items in the cart in hour } h}{\text{Total number of carts in hour } h}$$

For example, the following can be an x value for a Monday in the first week of a January for a particular hour. For an hour h the system may take the average values on first Mondays in the past twelve months and calculate x, $$x = \dfrac{1}{12} \times (A_h(dec) + A_h(nov) + \ldots + A_h(jan))$$

In this example, if the average number of items in the cart for the first Mondays in the past twelve months are 10, 9, 6, 8, 13, 7, 6, 5, 6, 7, 4, 9 then the value of x is, $$x = \dfrac{10+9+6+8+13+7+6+5+6+7+4+9}{12} = 7.5$$

The system may obtain 24 data points corresponding to each hour of the day. The system 50 may perform a similar process for the second Monday in the first half of the month. This may give a total of 48 data points.

These data points are substituted into the linear regression model $z=\alpha+\beta x+\gamma y$ to estimate the values of $\alpha$, $\beta$, $\gamma$. This unique triplet is the model used for estimating z for all the Mondays in the first half of the month. This process of computing is repeated at the beginning of every month to ensure that the system 50 utilizes models based on latest data.

Predicting the amount of items in the cart 14 from the Model may be accomplished in operating the counting processor 53. Counting processor 53 may predict z for a customer at 11:30 hours in the checkout register on a first Monday of the month. In this example, the system 50 considers the 11:00-12:00 hours as our h. For Monday the counting processor 53 uses the model: $z=\alpha+\beta x+\gamma y$. The y value may be obtained from the real time data. The x value may be computed using data in the near past, such as the last three months, and example of such is represented as:

$$x = \frac{1}{3} \times (A_h(Dec) + A_h(Nov) + A_h(Oct))$$

The counting processor 53 applies the x and y values to the models to obtain z, the predicted value of the number of items in the cart.

The efficiency analyzer 54 determines a historical efficiency of an employee at a checkout register. The efficiency analyzer 54 determines the number of items scanned per minute for a particular employee and records the same in a database as historical efficiency data, wherein the efficiency analyzer utilizes the historical efficiency data to determine a wait time for the queue at which the employee is working.

For example, $\text{Eff}(E_j)$ is the efficiency of the employee in the $j^{th}$ queue. Efficiency of the employee is measured by the number of items scanned per minute. This is calculated based on the history data which can be pulled from the store database. This information for the number of scans done by an employee is extracted from the store internal database. The system 50 uses a window of past t days for computing the efficiency.

$$\text{Efficiency of employee} = \frac{\text{Number of items scanned in past } t \text{ days}}{\text{Number of minutes worked in past } t \text{ days at register}}$$

As days pass, the window of the past t days shifts to incorporate the latest performance of an employee, making the system dynamic.

The proximity processor 56 receives data from a customer through an input device and outputs a proximity of the customer to a queue.

The cart analyzer 60 receives data from carts in a particular checkout queue and determines the number of carts in the particular checkout queue. The cart analyzer 60 receives data from the counting processor 53 and outputs the total number of items in the total number of carts in the particular checkout queue.

Figure 4:
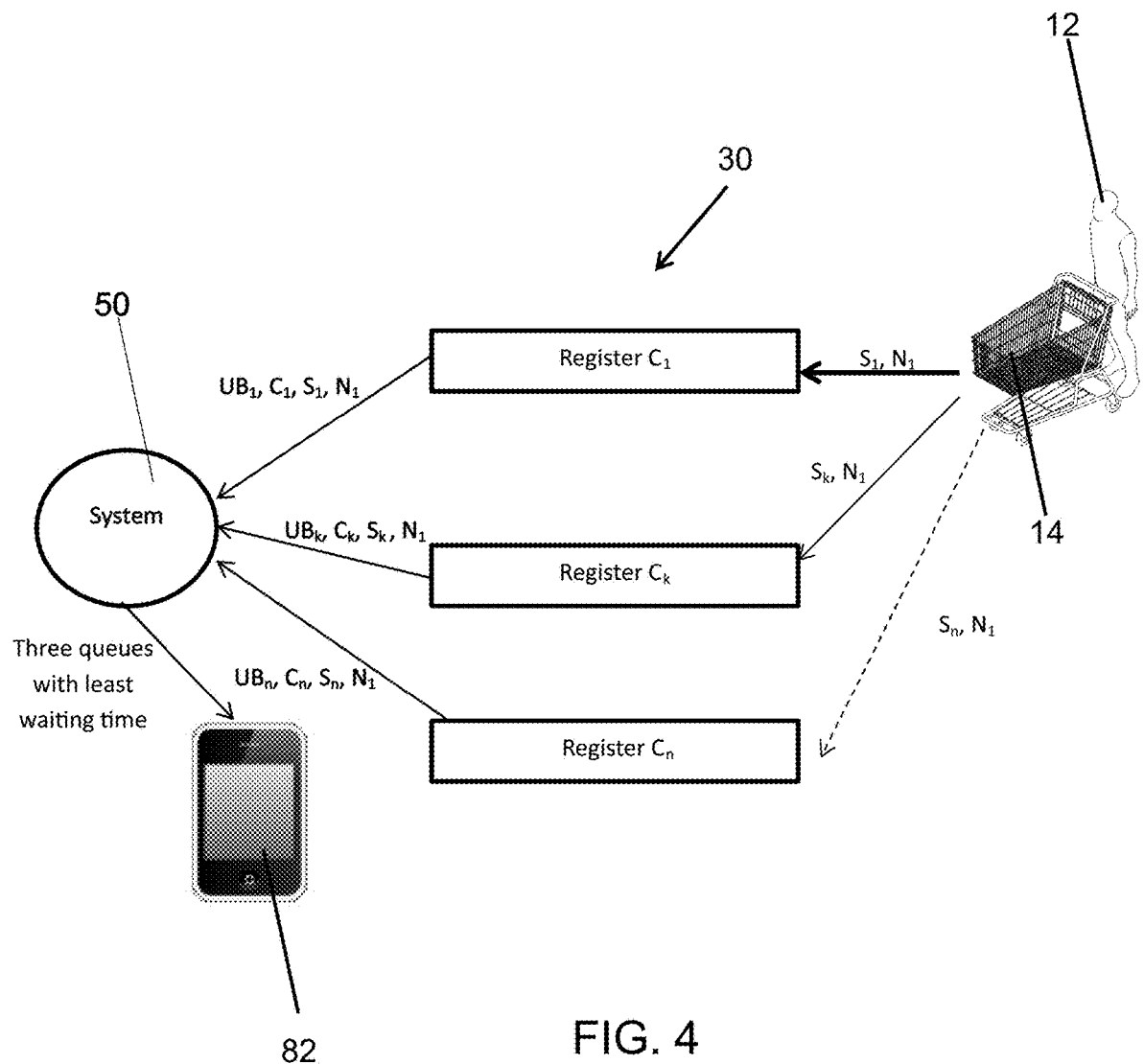
FIG. 4 is an illustrative view of system for reducing wait time in a store, in accordance with some embodiments.

FIG. 4 is a block diagram of a system 50 for reducing wait time in a store. Each cart may include a wireless communication device, such as, but not limited to a Bluetooth device which will be paired with the system 50. With regard to FIG. 4, (S, N): (Bluetooth Signal, Number of items in the cart (calculated using counter)), and (UB, C, S, N): (Unique Bluetooth ID, Register identification number, Bluetooth signal strength received from Cart, Number of items in the cart received from cart).

When the customer joins the queue, the cart will send its counter information to the Bluetooth receivers at the registers. The registers will communicate to the system its unique id, the counter information and Bluetooth signal strength as received from the cart. To determine which queue the customer has joined, the system compares the signal strength. The system will assume that the register's Bluetooth, which receives the maximum signal from the cart 14, is the register which the customer has joined. This will provide the information of the carts present in a queue/register and also the number of items in the carts in the queue. This communication flow is a continuous process and thus will be able to account for any dynamics. Finally, the system may compute a predetermined number of registers with least waiting time, such as the top three registers with least waiting time and send to the customer.

Figure 5:
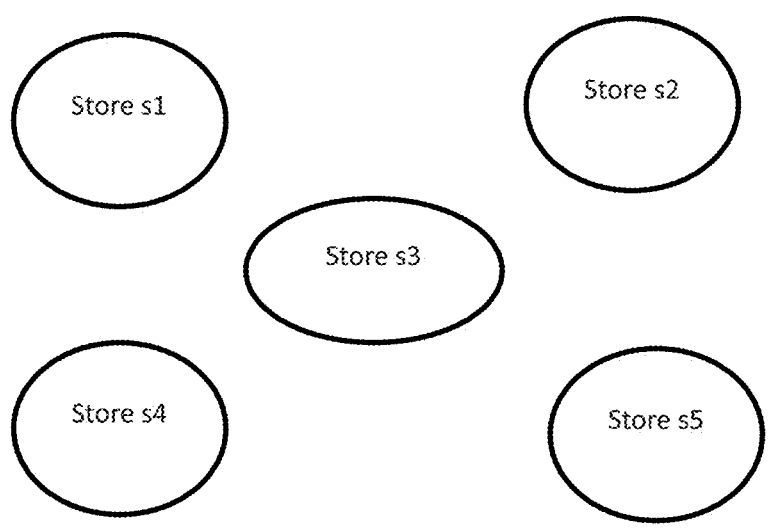
FIG. 5 is an illustrative view of a plurality of nearby stores.

The comparison processor 62 receives wait time data from the store and nearby stores for comparing average wait time of each store. The system 50 also utilizes the comparison processor 62 to prompt the store manager to open a new counter in case of higher than average waiting time for the customers. The time spent by the customers at the checkout queue is reflective of the satisfaction of their experience. FIG. 5 depicts 5 stores that are of a similar size and the same store type operating under the same store name. The system 50 utilizes the comparison processor 63 to allow a store manager in one of the stores s1-s5 to determine how his or her store compares with the other nearby stores. This also assists the system 50 to determine if a new register should be operated to account for wait times that extend beyond the average of the other store.

The wait time processor 58 determines the wait time of a plurality of checkout queues and outputs the same to the customer. The wait time processor 58 operates to determine the time taken for one Customer ($c_{tot}+1$) to reach the checkout with x items in the cart as follows:

Servicing Time=$\text{Min}(T_j(\text{Cart}(c_j+1), Q_j, E_j))$ $1 \leq j \leq n$ The wait time processor 58 operates to determine the time taken for same customer to complete checkout.

$$\text{Turnaround Time} = \text{Servicing Time} + \left(\frac{1}{E_j} \times x\right)$$

The wait time processor 58 combines the servicing time with the turnaround time to reach the wait time for the queue. The servicing time for every customer throughout the day and compute the average waiting time for a customer. This average waiting time of a customer is computed for every store. If there are k stores, the system may compute the average waiting time for system of k stores and plot the values for a defined period to evaluate the performance of each store as compared to neighboring stores. If a store is faring badly compared to the average waiting time, the system 50 will prompt the store manager to open a new checkout counter and reduce the waiting time. The system 50 will allow the store manager to set a threshold of the average waiting time in the store. If the threshold is crossed then an alert will be sent to the store manager. This will enable him to take a prompt action.

Figure 7:
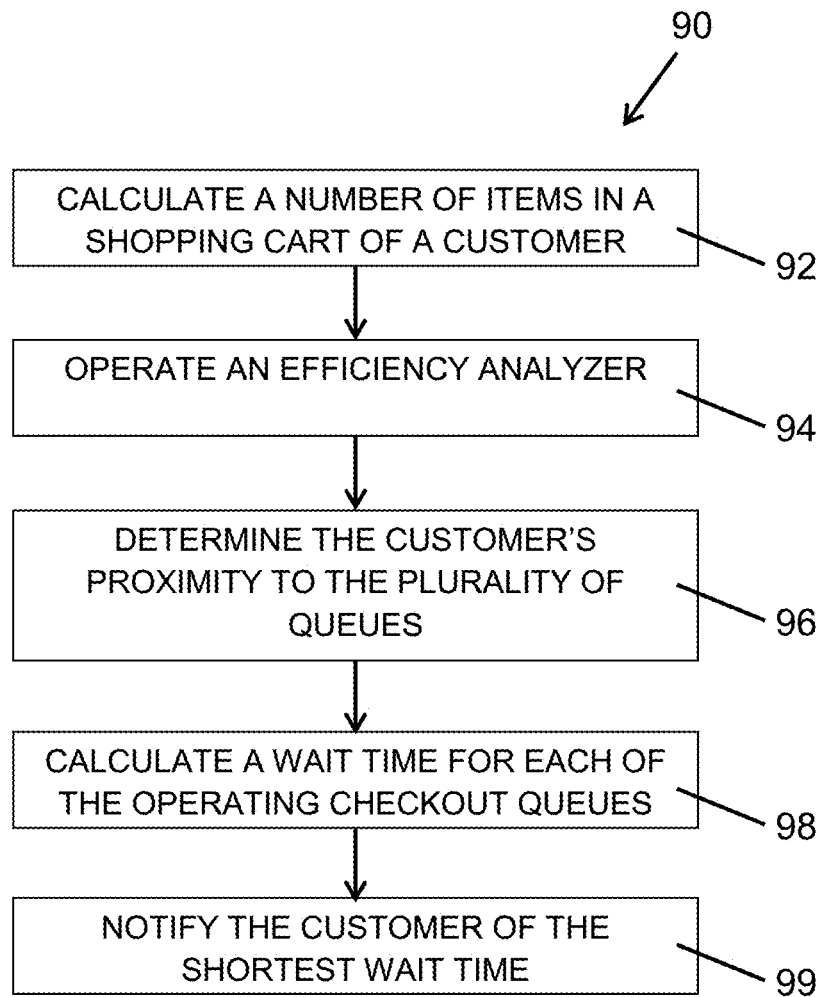
FIG. 7 a flow diagram illustrating a method for reducing wait time in a store, in accordance with some embodiments.

FIG. 7 depicts a method 90 of reducing wait time of a customer in store with a plurality of queues. The method 90 includes Step 92 of calculating a number of items in a shopping cart of a customer, wherein calculating the number items in the shopping cart comprises operating an item counting device to determine a real time number of items in the shopping cart. The method 90 also includes Step 94 of operating an efficiency analyzer to determine an efficiency of employees operating checkout queues. Additionally, the method 90 includes Step 96 of determining the customer's proximity to the plurality of queues; Step 98 of calculating a wait time for each of the operating checkout queues of the plurality of checkout queues; and Step 99 notifying the customer of the shortest wait time of a checkout queue of the operating checkout queues.

In embodiments, operating the item counting device comprises operating a weigh sensor of the item counting device to determine an increase in the weight of the cart in response to placing an item in the shopping cart. Additionally, operating the item counting device further comprises incrementing a counter in response to determining an increase in the weight of the cart by the weigh sensor.

The method 90 may also include calculating the number of items in the shopping cart comprises performing calculations based on the real time number of items in the shopping cart and historical cart size data; and forming the historical cart size data by recording cart size data of a plurality of carts in a database in response to scanning items in the plurality of carts at a plurality of checkout queues.

The method 90 further comprises calculating a number of carts in each operating queue of the plurality of queues, calculating a total number of items corresponding to the number of carts in each operating queue of the plurality of queues, and calculating an average wait time for the store and comparing the average wait time with nearby stores. The method 90 may also include opening additional checkout queues in response to a determination that the average wait time of the store is greater than the average wait time as the nearby store.

Figure 6:
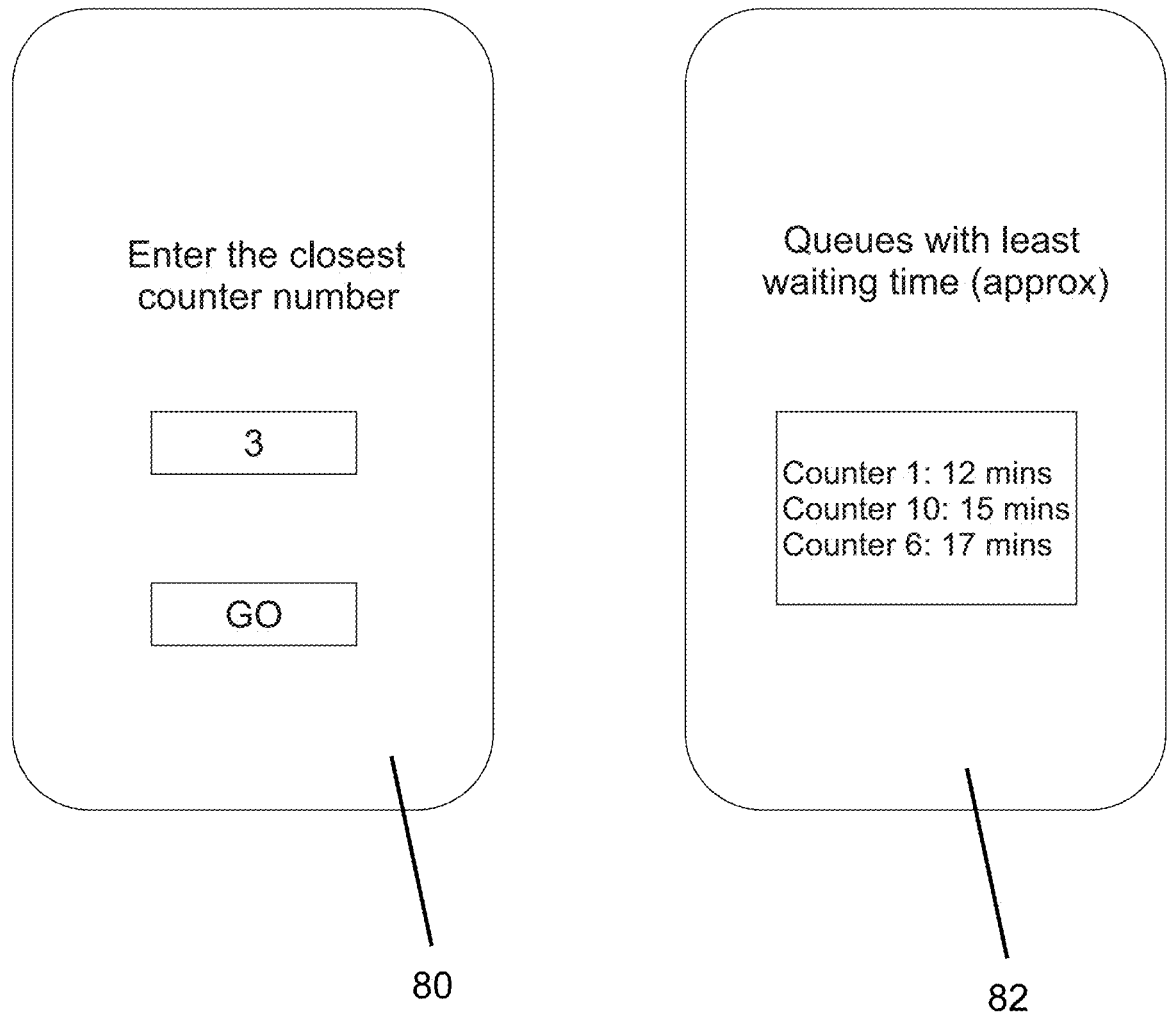
FIG. 6 is an illustrative view of a user interface of mobile computing device utilized by a customer during operation of the system.
Figure 8:
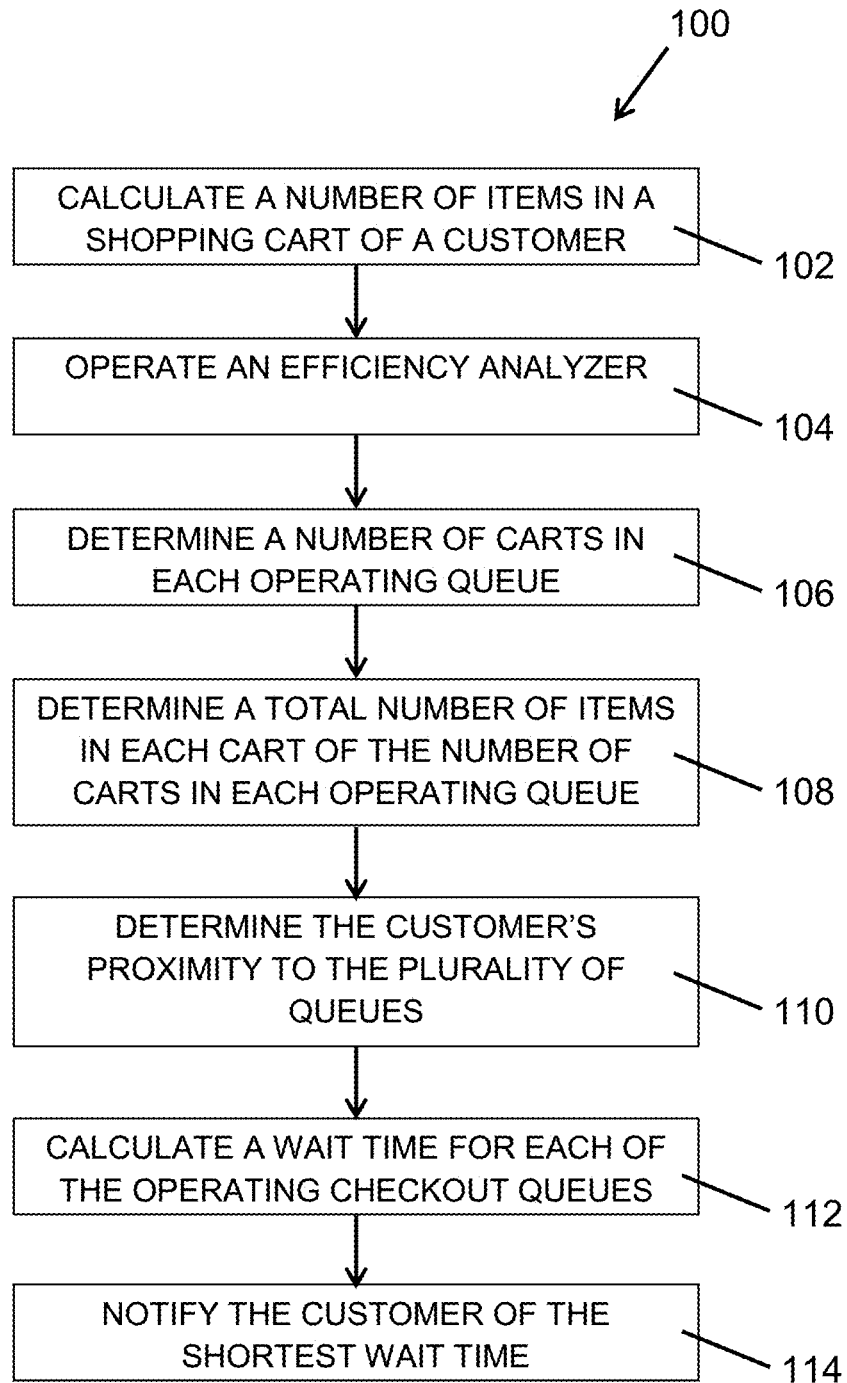
FIG. 8 is a flow diagram illustrating another method reducing wait time in a store, in accordance with some embodiments.

FIG. 8 depicts a method 100 of reducing wait time of a customer in store with a plurality of queues. The method 100 includes Step 102 of calculating a number of items in a shopping cart of a customer, wherein calculating the number items in the shopping cart comprises operating an item counting device to determine a real time number of items in the shopping cart. Method 100 further includes Step 104 of operating an efficiency analyzer to determine an efficiency of employees operating checkout queues. The method 100 then includes Step 106 of determining a number of carts in each operating queue of the plurality of queues. The method 100 also includes Step 108 of determining a total number of items in each cart of the number of carts in each operating queue; Step 110 of determining the customer's proximity to the plurality of queues; and Step 112 of calculating a wait time for each of the operating checkout queues of the plurality of checkout queues, wherein the wait time includes a calculation based on the number of items in the customer's cart, the total number of items in the number of carts in each operating checkout queue, and the efficiency of the employees operating the checkout queues. The method 100 also includes Step 114 of notifying the customer of a predetermined number wait times of a predetermined number of closest checkout queues of the operating checkout queues. This may be accomplished as in FIG. 6, wherein the customer may indicate the queue that the customer is closest to using a first user interface 80 of a mobile computing device. The system 50 notifies the customer of the smallest wait time of all of the queues as shown in user interface 82 located on a mobile computing device.

The step of operating the item counting device of Step 102 may further comprise operating a weigh sensor of the item counting device to determine an increase in the weight of the cart in response to placing an item in the shopping cart; and incrementing a counter in response to determining an increase in the weight of the cart by the weigh sensor.

The method 100 comprises calculating the number of items in the shopping cart comprises performing calculations based on the real time number of items in the shopping cart and historical cart size data formed by recording cart size data of a plurality of carts in a database in response to scanning items in the plurality of carts at a plurality of checkout queues. The method also includes calculating a number of carts in each operating queue of the plurality of queues, and calculating a total number of items corresponding to the number of carts in each operating queue of the plurality of queues.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, cloud-based infrastructure architecture, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the invention has been shown and described with reference to specific preferred embodiments, it should be understood by those skilled in the art that various changes in form and detail may be made therein without departing from the spirit and scope of the invention as defined by the following claims.

What is claimed is:

1. A system for determining waiting time in store with a plurality of checkout queues, the system comprising:
   an item counting device and a wireless communication device coupled to a shopping cart, the item counting device comprising a weigh sensor and a counter, wherein the counter increments by 1 in response to the weigh sensor detecting an increase in weight as an item is placed within the shopping cart;
   an efficiency analyzer that determines a historical efficiency of an employee at a checkout register;
   proximity processor that receives data from a customer through an input device coupled to the wireless communication device coupled to the shopping cart and outputs a proximity of the customer to a queue;
   a counting processor, wherein the counting processor receives real time data from the item counting device and receives historical cart size data stored in a memory of the system and outputs a number of items within the shopping cart, wherein the counting processor predicts the number of items in a cart using a linear regression model to account for the real time data and the historical cart size data, the historical cart size data formed by previously recorded data of scanned items in a plurality of carts at a plurality of checkout queues and stored in a database, wherein the prediction of the number of items in the cart minimizes error in the real time count of items; and
   a wait time processor that determines the wait time of a plurality of checkout queues and outputs the same to the customer, wherein determining the wait time of each queue comprises calculating a serving time that is a function of a number of carts in a queue, a number of items in each cart in the queue determined by the counting processor and communicated from the wireless communication device coupled to each cart and the historical efficiency of the employee at the checkout register of the queue.

2. The system of claim 1, wherein the counter of the item counting device decrements by 1 in response to the weigh sensor detecting a decrease in weight as an item is removed from the shopping cart.

3. The system of claim 2, further comprising a counting processor, wherein the counting processor receives real time data from the item counting device and receives historical cart size data stored in a memory of the system and outputs a number of items within the shopping cart.

4. The system of claim 3, wherein the counting processor predicts the number of items in a cart using a linear regression model to account for the real time data and the historical cart size data.

5. The system of claim 4, further comprising a cart analyzer, wherein the cart analyzer receives data from carts in a particular checkout queue and determines the number of carts in the particular checkout queue.

6. The system of claim 5, wherein the cart analyzer receives data from the counting processor and outputs the total number of items in the total number of carts in the particular checkout queue.

7. The system of claim 5, further comprising a comparison processor, wherein the comparison processor receives wait time data from the store and nearby stores for comparing average wait time of each store.

8. The system of claim 1, wherein the efficiency analyzer determines the number of items scanned per minute for a particular employee and records the same in a database as historical efficiency data, wherein the efficiency analyzer utilizes the historical efficiency data to determine a wait time for the queue at which the employee is working.

9. A method of reducing wait time of a customer in store with a plurality of queues, the method comprising:
calculating a number of items in a shopping cart of a customer, wherein calculating the number of items in the shopping cart comprises operating an item counting device comprising a weigh sensor and a counter, wherein the counter increments by 1 in response to the weigh sensor detecting an increase in weight as an item is placed within the shopping cart to determine a real time number of items in the shopping cart, wherein calculating the number of items in the shopping cart comprises predicting a number of items in the cart in response operating a counting processor, wherein the counting processor receives real time data from the item counting device and receives historical cart size data stored in a memory of the system and outputs a number of items within the shopping cart, wherein the counting processor predicts the number of items in a cart using a linear regression model to account for the real time data and the historical cart size data, the historical cart size data formed by previously recorded data of scanned items in a plurality of carts at a plurality of checkout queues and stored in a database, wherein the prediction of the number of items in the cart minimizes error in the real time count of items;
operating an efficiency analyzer to determine an efficiency of employees operating checkout queues;
determining the customer's proximity to the plurality of queues;
calculating a wait time for each of the operating checkout queues of the plurality of checkout queues, wherein calculating the wait time of each of the operating checkout queues comprises calculating a serving time that is a function of a number of carts in each operating checkout queue, a number of items in each cart in each operating checkout queue determined by the counting processor and the historical efficiency of the employee operating each operating checkout queue; and
notifying the customer of the shortest wait time of a checkout queue of the operating checkout queues by sending the notice to a mobile computing device of the customer, wherein the shortest wait time is the operating checkout queue with the least serving time.

10. The method of claim 9, wherein operating the item counting device comprises operating a weigh sensor of the item counting device to determine an increase in the weight of the cart in response to placing an item in the shopping cart.

11. The method of claim 10, wherein operating the item counting device further comprises incrementing a counter in response to determining an increase in the weight of the cart by the weigh sensor.

12. The method of claim 9, further comprising forming the historical cart size data by recording cart size data of a plurality of carts in a database in response to scanning items in the plurality of carts at a plurality of checkout queues.

13. The method of claim 9, further comprising calculating a number of carts in each operating queue of the plurality of queues.

14. The method of claim 13, further comprising calculating a total number of items corresponding to the number of carts in each operating queue of the plurality of queues.

15. The method of claim 9, further comprising calculating an average wait time for the store and comparing the average wait time with nearby stores.

16. The method of claim 15, further comprising opening additional checkout queues in response to a determination that the average wait time of the store is greater than the average wait time as the nearby store.

17. A method of reducing wait time of a customer in store with a plurality of queues, the method comprising:
calculating a number of items in a shopping cart of a customer, wherein calculating the number of items in the shopping cart comprises operating an item counting device comprising a weigh sensor and a counter, wherein the counter increments by 1 in response to the weigh sensor detecting an increase in weight as an item is placed within the shopping cart to determine a real time number of items in the shopping cart, wherein calculating the number of items in the shopping cart comprises predicting a number of items in the cart in response operating a counting processor, wherein the counting processor receives real time data from the item counting device and receives historical cart size data stored in a memory of the system and outputs a number of items within the shopping cart, wherein the counting processor predicts the number of items in a cart using a linear regression model to account for the real time data and the historical cart size data, the historical cart size data formed by previously recorded data of scanned items in a plurality of carts at a plurality of checkout queues and stored in a database, wherein the prediction of the number of items in the cart minimizes error in the real time count of items;
operating an efficiency analyzer to determine an efficiency of employees operating checkout queues;
determining a number of carts in each operating queue of the plurality of queues;
determining a total number of items in each cart of the number of carts in each operating queue by operating an item counting device;
determining the customer's proximity to the plurality of queues by operating a proximity processor;
calculating a wait time for each of the operating checkout queues of the plurality of checkout queues by operating a wait time processor, wherein the wait time includes a calculation based on the number of items in the customer's cart, the total number of items in the number of carts in each operating checkout queue determined by the counting processor, and the efficiency of the employees operating the checkout queues; and
notifying the customer of a predetermined number wait times of a predetermined number of closest checkout queues of the operating checkout queues by sending the notice to a mobile computing device of the customer.

18. The method of claim 17, further comprising calculating a number of carts in each operating queue of the plurality of queues, and calculating a total number of items corresponding to the number of carts in each operating queue of the plurality of queues.

* * * * *